United States Patent
Dumler et al.

(10) Patent No.: US 10,273,035 B2
(45) Date of Patent: Apr. 30, 2019

(54) POURING CONTAINER FOR STORING POURABLE FOODSTUFFS

(71) Applicant: keeeper GmbH, Stemwede (DE)

(72) Inventors: Alex Dumler, Hamburg (DE); Florian M. Witt, Wentorf (DE); Johanna Königsberger, Hamburg (DE); Matthias Hecker, Hamburg (DE); Thorsten Plate, Hamburg (DE); Andrew Ferrier, Ottawa (CA)

(73) Assignee: KEEPER GmbH, Stemwede (DE)

( * ) Notice: Subject to any disclaimer, the term of this patent is extended or adjusted under 35 U.S.C. 154(b) by 0 days.

(21) Appl. No.: 15/885,851

(22) Filed: Feb. 1, 2018

(65) Prior Publication Data
US 2018/0215495 A1 Aug. 2, 2018

(30) Foreign Application Priority Data
Feb. 2, 2017 (EP) ..................... 17154469

(51) Int. Cl.
- *B65D 1/02* (2006.01)
- *B65D 39/00* (2006.01)
- *B65D 1/42* (2006.01)
- *A47J 47/06* (2006.01)

(52) U.S. Cl.
CPC ............ *B65D 1/0292* (2013.01); *A47J 47/06* (2013.01); *B65D 1/0207* (2013.01); *B65D 1/42* (2013.01); *B65D 39/0023* (2013.01)

(58) Field of Classification Search
CPC ...... B65D 1/0292; B65D 1/0207; B65D 1/42; B65D 39/0023; B65D 2543/00296; B65D 2543/0037

USPC ......................................................... 222/529
See application file for complete search history.

(56) References Cited

U.S. PATENT DOCUMENTS

| | | | | |
|---|---|---|---|---|
| 3,559,847 A | * | 2/1971 | Goodrich | B65D 25/44 222/107 |
| 4,180,178 A | * | 12/1979 | Turner | B65D 43/0212 215/317 |
| 4,308,970 A | * | 1/1982 | Von Holdt | B29C 45/43 220/790 |

(Continued)

FOREIGN PATENT DOCUMENTS

| | | |
|---|---|---|
| DE | 298 04 369 | 8/1999 |
| EP | 1 148 804 | 10/2001 |

(Continued)

*Primary Examiner* — Benjamin R Shaw
(74) *Attorney, Agent, or Firm* — Gudrun E. Huckett (57) ABSTRACT

A container for pourable foodstuffs has a base, a side wall connected to the base and surrounding a storage chamber. An elastic cuff is connected with a first end to the side wall and has a second end with an opening. The cuff width decreases from first to second end along a longitudinal container axis. The elastic cuff can be pushed into and pulled out of the storage chamber. A sealing element shaped as a stopper can be inserted into the opening for closing the container and has a shank portion matched in shape and size to the opening such that sealing abutment of a shank portion surface against surfaces of the elastic cuff adjoining the cuff opening is established in a contact region of the shank portion when the stopper is inserted. The shank portion has an end with a thickened portion thicker than the contact region.

8 Claims, 6 Drawing Sheets

(56) References Cited

U.S. PATENT DOCUMENTS

| | | | | |
|---|---|---|---|---|
| 4,341,324 | A * | 7/1982 | Ramirez | B65D 21/0233 |
| | | | | 206/520 |
| 4,569,464 | A * | 2/1986 | Wassilieff | B65D 47/063 |
| | | | | 222/529 |
| 5,088,632 | A * | 2/1992 | Odet | B65D 47/063 |
| | | | | 222/529 |
| 5,240,154 | A * | 8/1993 | Van Den Berghe | |
| | | | | B65D 47/2056 |
| | | | | 222/499 |
| 5,860,556 | A * | 1/1999 | Robbins, III | B65D 1/0292 |
| | | | | 220/608 |
| 2004/0040972 | A1* | 3/2004 | Haj | B65D 1/0292 |
| | | | | 220/666 |
| 2004/0206765 | A1* | 10/2004 | McMahon, III | B65D 43/0222 |
| | | | | 220/780 |
| 2005/0260101 | A1* | 11/2005 | Nauck | B01J 19/0046 |
| | | | | 422/400 |
| 2011/0114679 | A1* | 5/2011 | Park | B65D 47/063 |
| | | | | 222/529 |
| 2012/0085794 | A1* | 4/2012 | Selina | B65D 47/063 |
| | | | | 222/530 |
| 2016/0198826 | A1* | 7/2016 | Bellas | A45C 11/008 |
| | | | | 220/521 |
| 2017/0369212 | A1* | 12/2017 | Kim | B65D 43/02 |

FOREIGN PATENT DOCUMENTS

| | | |
|---|---|---|
| EP | 1 468 933 | 10/2004 |
| EP | 1 775 232 | 4/2007 |
| GB | 1 237 542 | 6/1971 |
| WO | 2011/096814 | 8/2011 |

\* cited by examiner

POURING CONTAINER FOR STORING POURABLE FOODSTUFFS

BACKGROUND OF THE INVENTION

The present invention relates to a pouring container for storing pourable foodstuffs. The pouring container has a base, a side wall surrounding a storage chamber, an upper opening and a sealing element, wherein a cuff made of an elastic material is fitted on the pouring container, the first end of the cuff being connected to the side wall of the pouring container and the second end of the cuff bounding the opening, which is closable with the sealing element, wherein the width of the cuff decreases from its first end to the second end along the longitudinal axis of the pouring container, and wherein the cuff is able to be pushed into and pulled back out of the storage chamber along the longitudinal axis of the pouring container on account of the elasticity of the elastic material.

A pouring container of the generic type is known from the document WO 2011/096814. Provided as closure is a central spike which extends upward from the base, through the interior of the container, into the region of the cuff, and against which the cuff can be placed. The spike results in a considerable part of the filling volume of the container being lost. Filling and emptying of the container always have to take place around the spike, this being very impractical.

Containers of the generic type with flexible lid-like closures, which are provided with pressure compensation valves, are known from the documents EP 1 468 933 B1 and EP 1 775 232 A2. The valve bodies are movable in relation to the rest of the closure. In order to be able to fill and empty the containers, the lid-like closures have to be completely removed and fitted again in each case.

Another pouring container is known from the document DE 298 04 369 U1. The pouring container serves in particular to store and present pourable foodstuffs such as cereals. However, it is also possible for other pourable foodstuffs to be stored therein, for example sugar, flour, spices and other foodstuffs. It is also possible for creamy or liquid foodstuffs to be stored in the pouring container. The container has an inclined removal opening and a pivotable sealing element. However, it proves to be difficult to fill the pouring container through the removal opening. Furthermore, the sealing element does not seal off the storage chamber optimally from the outside.

The object of the present invention is to improve the fillability and tightness of the storage chamber of the container.

SUMMARY OF THE INVENTION

The object is achieved, for a pouring container of the generic type, in that the sealing element is formed as a stopper which is able to be inserted into the opening and has a shank portion, the shape and size of which are adapted to the shape and size of the opening such that, in the contact region of the shank portion, sealing abutment of the surface of the shank portion against the surfaces of the material, adjoining the opening, of the cuff is established, and the shank portion has, at its end facing the storage chamber, a thickened portion in relation to its shape in the contact region of the sealing abutment of the adjoining material of the cuff.

In terms of its material and material thickness, the elastic material of the cuff should be constituted such that it has sufficient flexural rigidity in order to maintain its respective position set by the user, at least in the end positions, without moving. The end positions are the position of the cuff pushed into the storage chamber and the position of the cuff pulled out of the storage chamber. However, the elastic material should also be soft enough that the cuff can be easily pushed into the storage chamber by a user, but can also be easily pulled out again. The dimensions of the cuff should also be such that the filling funnel and the pouring funnel are readily formed after the cuff has been transposed.

In the pushed-in position, the cuff has a funnel shape with the opening formed at the second end, the opening leading into the storage chamber. The pouring container can be filled very easily via the cuff in that the pourable foodstuff is poured simply onto the outwardly directed free face of the cuff. As a result of the funnel shape, all of the particles of foodstuff which strike the cuff slide toward the opening under the force of gravity and drop from there into the interior of the storage chamber. Therefore, the transport container, from which the pourable foodstuff is transferred into the pouring container, no longer has to be held precisely above the opening. Also, the feed quantity of foodstuff poured onto the cuff can fluctuate because the funnel formed by the cuff forms a buffer store in which, in the event of an excessive feed quantity, the foodstuff accumulates in the funnel and, when the feed quantity is reduced, flows through the opening again. The user can adapt the metering of the quantity of foodstuff poured out readily to the quantity of foodstuff currently located in the funnel because the metering requirements are readily apparent.

When the cuff has been pulled out of the storage chamber, the cuff forms a kind of truncated cone in side view, which narrows upwardly toward the opening and protrudes beyond the upper edge of the side wall. In this way, the cuff forms a pouring funnel which narrows toward the opening and with which the foodstuff located in the storage chamber can be discharged in a controlled manner through the opening. By way of the pouring funnel, both the outlet location and the outlet quantity of the pourable foodstuff is more easily controllable.

The sealing element of the pouring container is adapted in terms of its shape and size to the dimensions of the opening. The sealing element can be realized in a wide variety of embodiments, for example as a lid-like screwable sealing element, a sealing element that is fastened in a clamping manner, a stopper, a latching sealing element or a sealing element with a twist/push closure.

The longitudinal axis of the pouring container extends from the base of the pouring container to the upper end thereof. The change in position of the cuff does not have to take place precisely along the longitudinal axis; depending on the geometric shape of the pouring container and the cuff, slight deviations can also arise.

In order for the storage chamber to contain as little oxygen as possible, which can react with the stored foodstuff, it is advantageous for the cuff to be pushed into the storage chamber. The storage chamber is reduced in size as a result. Since the storage chamber is filled at least partially with the foodstuff, the reduction in chamber has an effect in particular on the volume of residual air and thus also on the oxygen volume which is located in the storage chamber in addition to the foodstuff. When a foodstuff has been filled into the storage chamber, it is even possible, depending on the filling level of the foodstuff in the storage chamber, for the cuff to be pushed down onto the surface of the foodstuff, such that scarcely any air with an oxygen fraction remains in the storage chamber. As a result, the freshness and durability of a foodstuff in the storage chamber can be extended considerably.

The sealing element is formed as a stopper which is able to be inserted into the opening and has a shank portion, the shape and size of which are adapted to the shape and size of the opening such that, in the contact region of the shank portion, sealing abutment of the surface of the shank portion against the surfaces of the material, adjoining the opening, of the cuff is established. The stopper can be inserted into the opening and removed therefrom again quickly and easily. As a result of the sealing abutment of the shank portion against the material of the cuff, a force-fitting connection arises between the surfaces, it being possible for the force-fitting connection also to be used in order to transpose the cuff from the pushed-in position to the pulled-out position, or vice versa, by pulling or pushing on the sealing element. The appearance of the adaptation of the size and shape of the shank portion can be such that, in the contact region with the cuff, the shank portion has a slight oversize compared with the dimension that the opening has in the relaxed state of the material of the cuff in the region of the opening. As a result of the oversize of the shank portion, the material of the cuff is stretched in the region of the opening with the sealing element plugged in, this resulting in an enhanced friction lock in the contact region. The enhanced friction lock can also be advantageous when a reduced pressure is intended to be established in the interior of the storage chamber.

The shank portion has, at its end facing the storage chamber, a thickened portion in relation to its shape in the contact region of the sealing abutment of the adjoining material of the cuff. As a result of the thickened portion, a kind of undercut behind the adjoining material, located in the contact region of the sealing abutment, of the cuff arises with the sealing element plugged in. As a result, the sealing element fits even more firmly in its closing position, and the quality of sealing is improved further. It is also possible for greater tensile forces to be transmitted between the sealing element and the cuff in the connection, such that the cuff can be transposed in particular even better from the pushed-in position to the pulled-out position.

According to one configuration of the invention, the cuff is connected to the side wall of the pouring container in a form-fitting manner. The form-fit can be established for example via a screw thread or a latch. As a result of the form-fitting connection, the cuff is connected sufficiently firmly to the side wall, in order not to be detached from the pouring container when the cuff is pushed in or pulled out. The form-fitting connection is also advantageous when a reduced pressure is intended to be established in the storage chamber, in order to improve the durability and long-term quality of the foodstuff stored therein.

According to one configuration of the invention, recesses are formed in the outer circumferential surfaces in the external shape of the pouring container. Via the recesses, the container can be grasped and held more securely, in particular when the cuff is pushed or pulled. The recesses can be formed in the faces of the side wall and/or in the container base.

According to one configuration of the invention, the pouring container and/or the sealing element has surface portions which are produced from a softer plastics material than the surfaces surrounding these surface portions. The pouring container can be held more securely when particular regions that are grasped when the pouring container and/or the sealing element is accessed are produced from a softer plastics material. In the case of the sealing element, the softer constituents can increase the force- and form-fit between these constituents in particular in the contact region with the cuff. When the pouring container is produced from a transparent material, fingerprints or other dirt which can pass onto the surface of the pouring container when it is touched are also less visible in this way. The production of plastics containers using two-component injection molding is technically easily manageable.

According to one configuration of the invention, the sealing element is able to be connected to the cuff and the cuff to the pouring container in a pressure- and/or gastight manner. The gastight connection prevents gas exchange from being able to take place between the storage chamber of the pouring container and the ambient air. In particular, exchange of oxygen, which can impair the durability of foodstuffs, should be avoided. When the oxygen present in the storage chamber after the last opening has been consumed by chemical conversion processes and reactions with the foodstuff, no more fresh oxygen can pass into the storage chamber without the sealing element being opened or the cuff being removed, and so the oxygen-dependent chemical processes are then stopped. With a reduced pressure in the storage chamber, the oxygen content is reduced even further as a result of the reduced residual air in the storage chamber. The reduced pressure can be established via the sealing element embodied in a pressure-tight manner when the latter is firmly closed only when, as a result of the cuff being pushed down into the storage chamber and the pouring container optionally also being squeezed, residual air has been pushed out of the storage chamber. Until the sealing element is firmly closed, air can still escape to the outside from the storage chamber through the opening.

According to one configuration of the invention, the pouring container is produced at least partially from a transparent material and the cuff is produced from a nontransparent material. As a result of the transparent material, a user can quickly see from the outside which foodstuff is located in the pouring container and how much thereof is left. However, since light also passes into the storage chamber through the transparent material, with the result that the foodstuff stored therein can heat up and/or the quality thereof can be reduced, it is advantageous if no light passes from above onto the foodstuff located in the pouring container via the cuff produced from a nontransparent material. The light incidence into the storage chamber is additionally reduced when parts of the side wall of the pouring container also consist of a nontransparent material.

According to one configuration of the invention, the cuff has a reinforcing element at its first and/or second end. In particular at points where the cuff is exposed to particular mechanical loads, a reinforcing element can improve the function of the cuff. In this way, a reinforcing element in the region of a screw connection of the cuff to the side wall can make screwing possible in the first place in that the screw thread is formed for example in the reinforcing element. In order to avoid excessive bending radii of the elastic material, a reinforcing element can also be formed close to the connection to the side wall such that it limits bending radii that are otherwise possible. In the region of the opening, a reinforcing element can allow the fastening of a sealing element. The reinforcing element can be introduced into the cuff as part of a two-component injection-molding process in the production of the latter, or the reinforcing element is adhesively bonded to, fused with or materially connected in some other way to the elastic material.

According to one configuration of the invention, the cuff has a materially weakened bending point in at least one region. The material thickness of the cuff does not have to be embodied in a uniformly thick manner. It is advantageous, to reduce the material thickness in those regions in which an excessive material thickness would limit or impede the mobility. In such regions, it is necessary to reduce the material thickness in order to move the cuff back and forth as easily as possible between the pushed-in and pulled-out positions. A bending point means not just one such point in the material of the cuff, which is bent at an angle, but also those points at which the material of the cuff is intended to follow a curve.

According to one configuration of the invention, the sealing element has an abutment above the shank portion. The abutment prevents the sealing element from being able to be pushed too far through the opening into the storage chamber.

It is expressly noted that each of the above-described configurations of the invention is combinable with the subject matter of the main claim in each case individually but also in any desired combinations with one another, unless there are any technical impediments to doing so.

Further modifications and configurations of the invention can be gathered from the following description of the subject matter and from the drawings.

BRIEF DESCRIPTION OF THE DRAWINGS

The invention will now be described in more detail by way of an exemplary embodiment.

DESCRIPTION OF PREFERRED EMBODIMENTS

Figure 1:
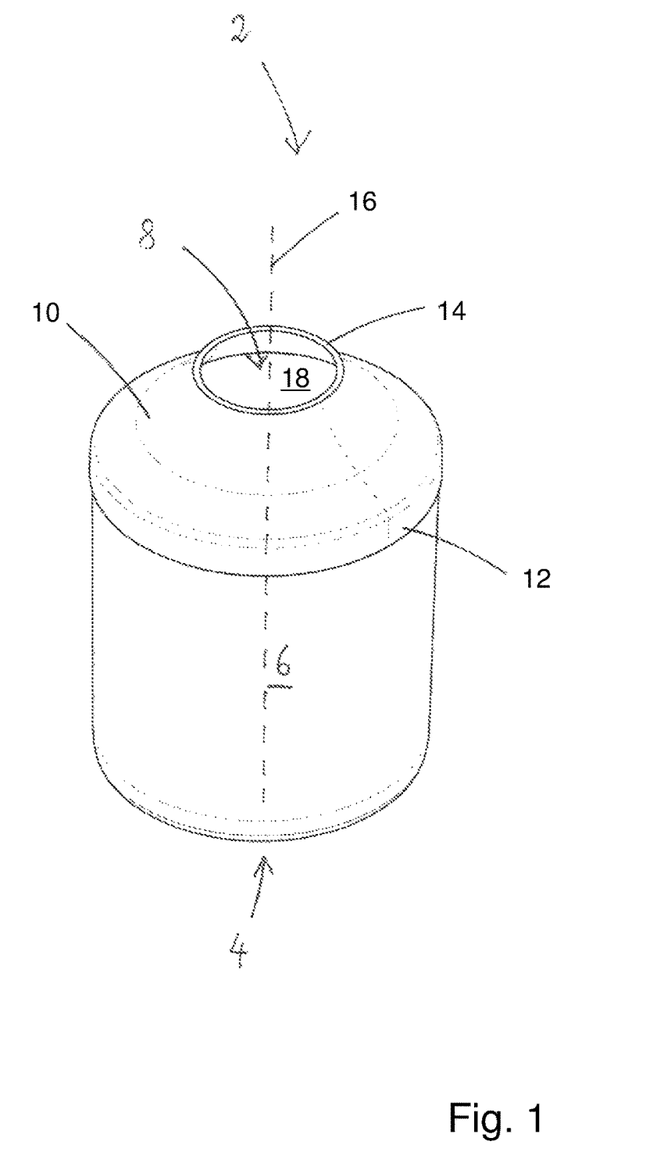
FIG. 1 shows a view obliquely from above of a pouring container with a pulled-out cuff.

FIG. 1 illustrates a pouring container 2 in a view obliquely from above. The pouring container 2 has a base 4 with a side wall 6. Toward the top, the pouring container 2 is opened by way of the upper opening 8, which is bounded by the cuff 10.

The cuff 10 has a first end by way of which the cuff 10 is connected to the side wall 6. The second end of the cuff 10 bounds the opening 8. The cuff 10 consists of an elastic material which makes it possible for the cuff 10 to be able to be pushed with its second end 14 into the storage chamber 18 along the longitudinal axis 16 and moved back out again into the pulled-out position illustrated in FIG. 1.

Figure 2:
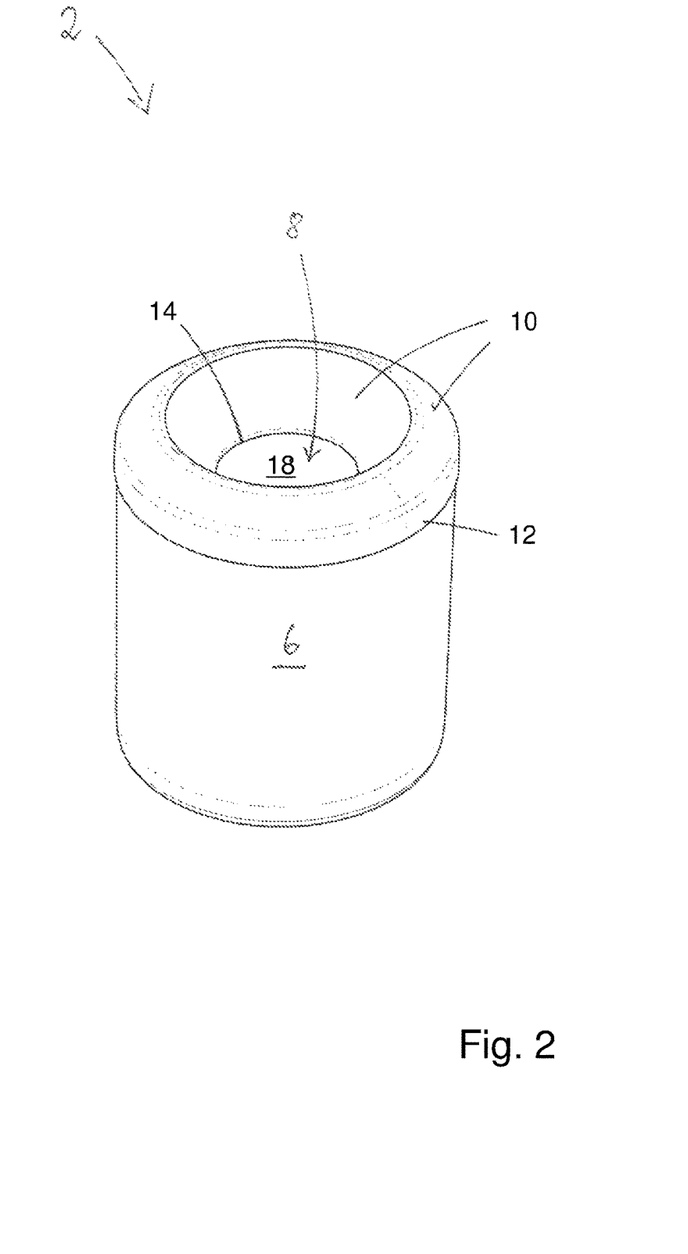
FIG. 2 shows the pouring container of FIG. 1 with a cuff pushed into the storage chamber.

FIG. 2 shows the pouring container 2 with a cuff 10 which has been pushed into the storage chamber 18. It is apparent from comparing the cuff 10 as is illustrated in FIGS. 1 and 2 that the cuff 10 forms a pouring funnel in the position illustrated in FIG. 1, while it creates a filling funnel in the position illustrated in FIG. 2. Through the opening 8, it is thus easily possible for a foodstuff to be both filled into and also poured back out of the storage chamber 18.

Figure 3:
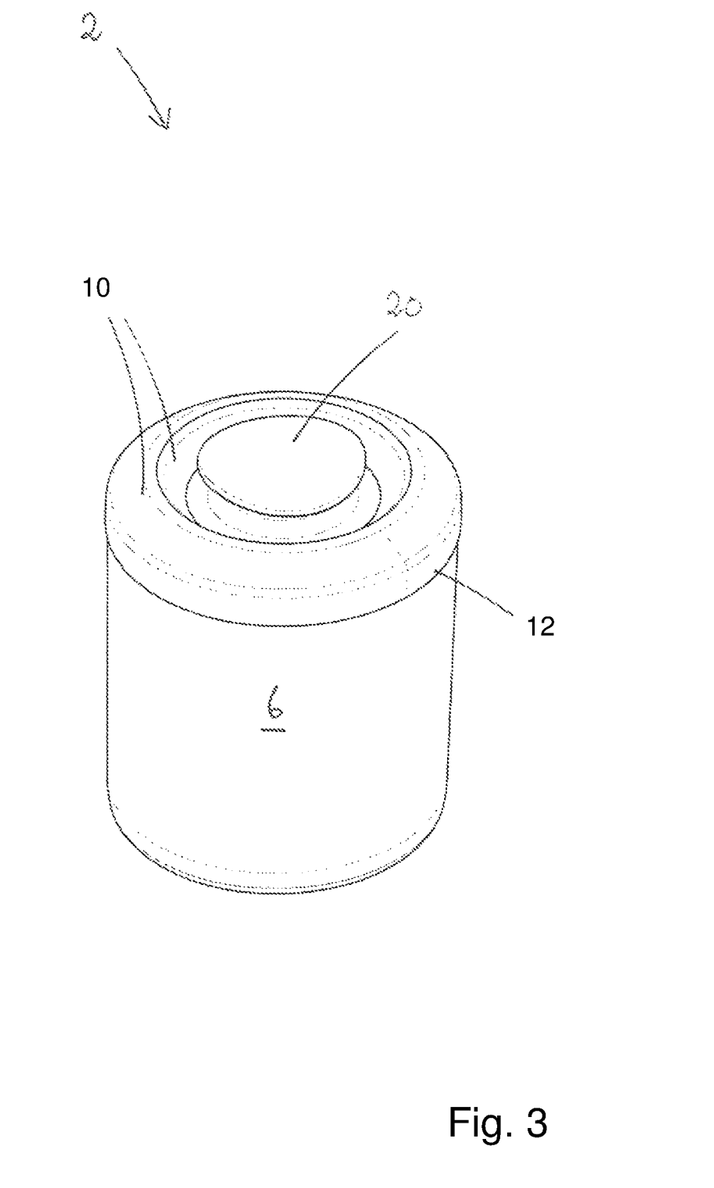
FIG. 3 shows the pouring container of FIG. 2 with an inserted sealing element.

FIG. 3 illustrates the pouring container 2 with a sealing element 20 which has been plugged into the opening 8, while the cuff 10 is in the pushed-in position.

Figure 4:
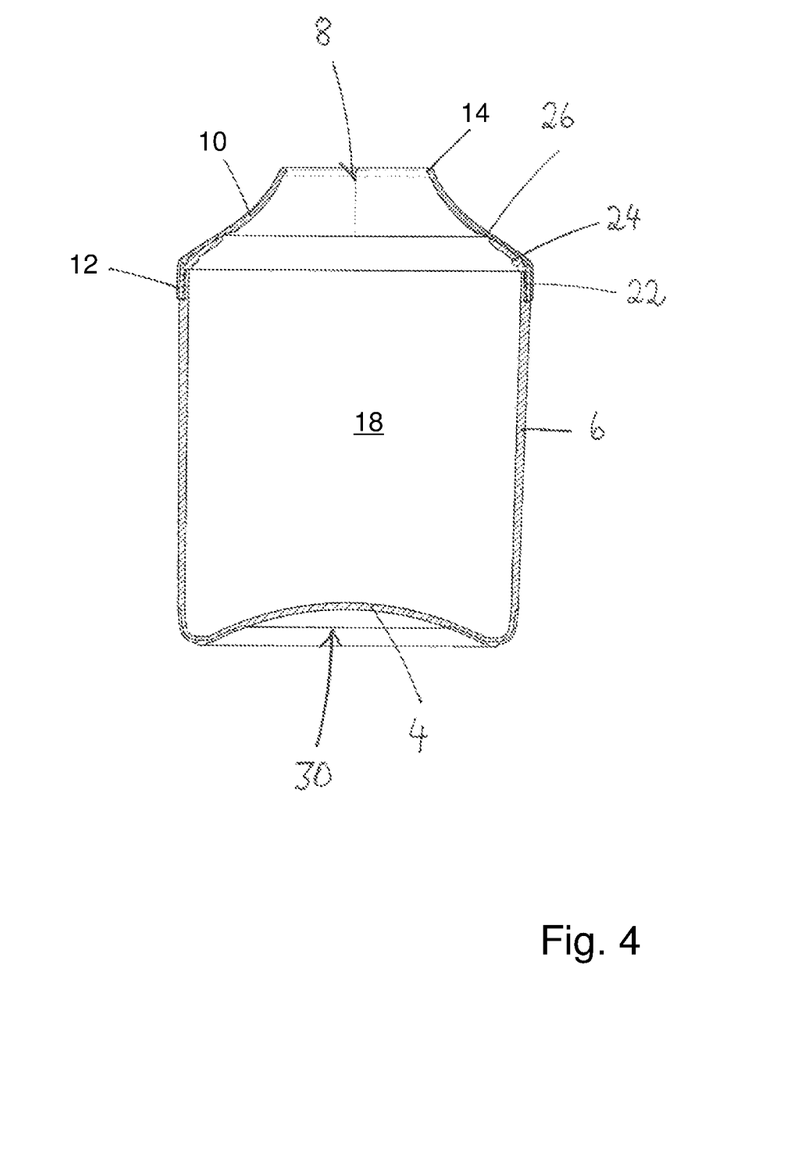
FIG. 4 shows a sectional view through the pouring container shown in FIG. 1.

FIG. 4 shows a sectional view through the pouring container 2 shown in FIG. 1. It is apparent from this sectional view that the cuff 10 is connected to the side wall 6 via a thread 22. At its first end 12, the cuff 10 has an internal thread, which is formed on a reinforcing element 24 that forms a constituent of the cuff 10 in this region. The reinforcing element 24 extends not only in the region of the thread 22 but also beyond the latter as far as a bending point 26 at which the material thickness of the material of the cuff 10 has a weakened portion. As a result of the weakened portion in the region of the bending point 26, the second end 14 of the cuff 10 can be pushed more easily into the storage chamber 18.

It is apparent from the sectional views in FIGS. 3 and 4 that the cuff 10 has in each case a kind of frustoconical shape in side view.

In the region of the base 4, the pouring container 2 furthermore has, as seen from the outside, a recess 30 in the form of an indentation in the base 4, it being possible for the pouring container 2 to be grasped and held better via the recess 30 during pouring.

Figure 5:
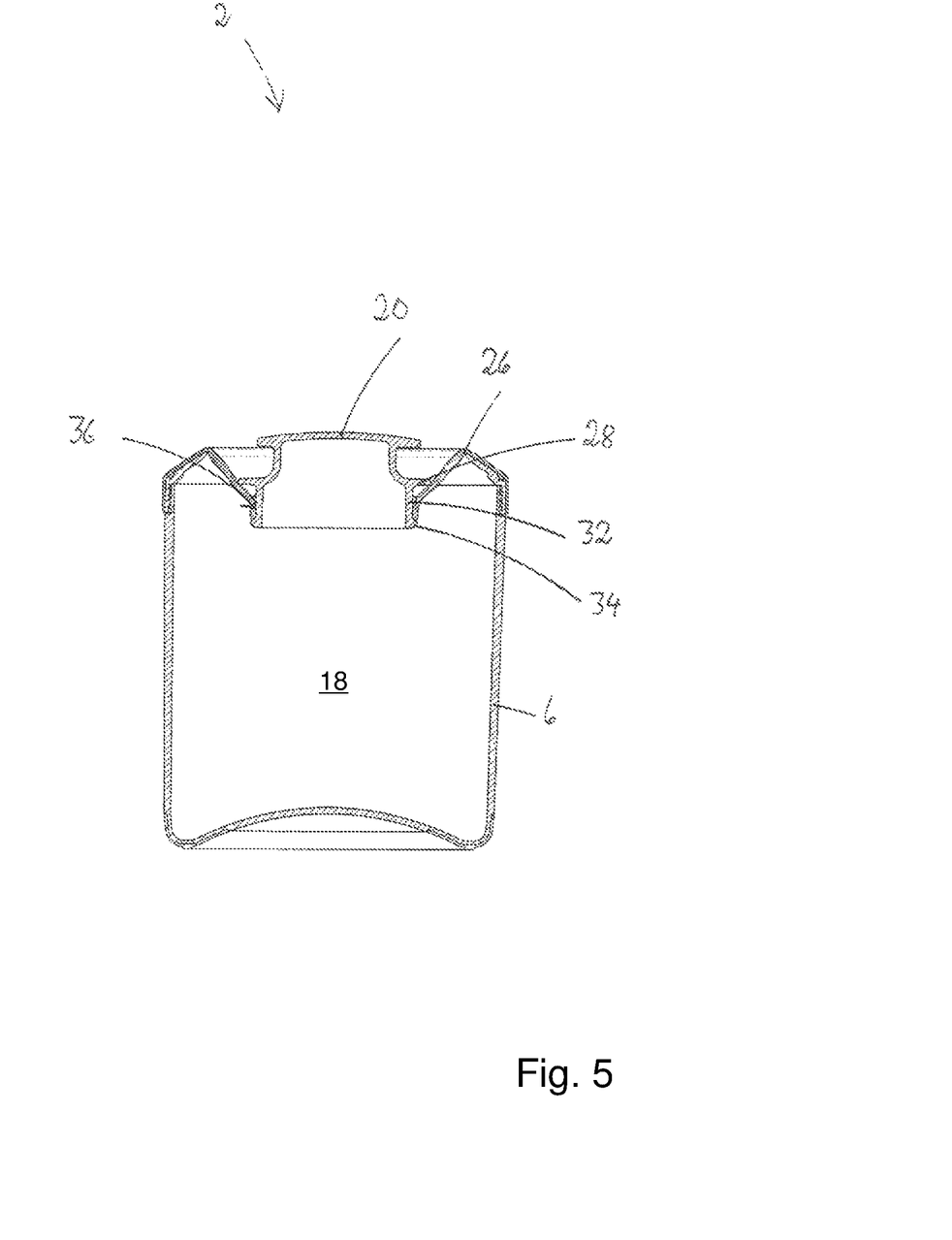
FIG. 5 shows a sectional view through the pouring container shown in FIG. 3.

FIG. 5 shows a sectional view through the pouring container shown in FIG. 3. In this view, the configuration of the sealing element 20 is more precisely apparent. The sealing element 20 has a shank portion 32, the outwardly directed surface of which has a contact region 36 in which sealing abutment of the material surrounding the opening 8 of the cuff 10 is established when the sealing element is plugged into the opening 8. The sealing element 20 has an abutment 28 which prevents the sealing element 20 from being plugged too far into the opening 8. The contact of the abutment 28 with the surface of the cuff 10 additionally has a stabilizing effect on the cuff 10 when the sealing element 20 is plugged into the opening 8.

In order that the sealing element 20 is held better in the closed position, the sealing element 20 additionally has a thickened portion 34 which forms a kind of undercut in the region of the second end 14 in relation to the material of the cuff 10. When the sealing element 20 is pulled out of the position illustrated in FIG. 5, the cuff 10 is first of all carried along out of the position pushed into the storage chamber 18 into the position pulled out of the storage chamber 18. When the cuff 10 has reached its end position, a further pull on the sealing element 20 can pull the sealing element out of the opening 8. When the opening 8 is closed, the above-described sequence takes place in the reverse order, in that the cuff 10 is first of all pushed down with the sealing element 20 until the cuff 10 has reached its end position, and then the sealing element 20 is pushed completely into its closed position. Of course, it is also possible to deviate from these sequences of movement.

Figure 6:
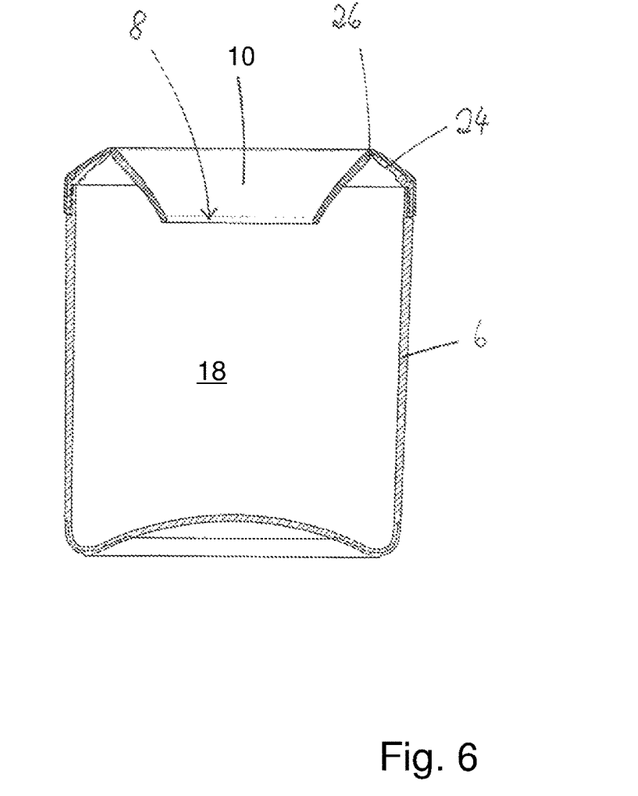
FIG. 6 shows a sectional view through the pouring container shown in FIG. 2.

FIG. 6 shows a sectional view through the pouring container shown in FIG. 2. In this case, the cuff 10 is in the pushed-in position. In this position, it is clearly apparent that the cuff 10 has been bent down in the region of the bending point 26. The funnel shape which the cuff 10 forms in this position is also clearly apparent. It is clearly apparent from this sectional view that the storage chamber 18 can be filled easily from above by pouring the foodstuff onto the surface of the cuff 10.

The above-described exemplary embodiment serves only to explain the invention. The invention is not limited to the exemplary embodiment. It will not be difficult for a person skilled in the art to modify the exemplary embodiment in a manner that appears appropriate to him in order to adapt it to a specific application.

The specification incorporates by reference the entire disclosure of European priority document 17 154 469.5 having a priority filing date of Feb. 2, 2017.

While specific embodiments of the invention have been shown and described in detail to illustrate the inventive principles, it will be understood that the invention may be embodied otherwise without departing from such principles.

What is claimed is:

1. A pouring container (2) for storing pourable foodstuffs, the pouring container comprising:
   a base (4);
   a side wall (6) connected to the base (4) and surrounding a storage chamber (18);
   a cuff (10) composed of an elastic material, the cuff (19) comprising a first cuff end (12) connected to the side wall (6) and comprising a second cuff end (14) comprising an upper opening (8);
   wherein a width of the cuff (10) decreases from the first cuff end (12) to the second cuff end (14) along a longitudinal axis (16) of the pouring container (2);
   wherein the cuff (10), due to an elasticity of the elastic material, is configured to be pushed into and pulled back out of the storage chamber (18) along the longitudinal axis (16) of the pouring container (2);
   a removable sealing element (20) configured to close the upper opening (8), wherein the removable sealing element (20) is shaped as a stopper configured to be inserted into the upper opening (8) and to be removed from the upper opening (8) to access the storage chamber (18);
   wherein the removable sealing element (20) comprises a shank portion (32) having a shape and a size adapted to a shape and a size of the upper opening (8) such that a sealing abutment of a surface of the shank portion (32) against surfaces of the elastic material of the cuff (10) adjoining the upper opening (8) of the cuff (10) is established in a contact region of the shank portion when the stopper is inserted into the opening;
   wherein the shank portion (32) comprises a first shank end facing the storage chamber (18) and the first shank end comprises a thickened portion that is thicker than the contact region of the shank portion;
   wherein the removable sealing element (20) comprises an annular abutment (28) arranged at a second shank end of the shank portion (32) remote from the first shank end, wherein the annular abutment (28) prevents the removable sealing element (20) from being pushed through the upper opening (8) into the storage chamber (18), and wherein an outer circumferential rim of the annular abutment (28) contacts a surface of the cuff (10) at a spacing above the upper opening (8) and provides a stabilizing effect on the cuff (10) when the stopper is inserted in the upper opening (8).

2. The pouring container (2) according to claim 1, wherein the cuff (10) is connected by form fit to the side wall (6) of the pouring container (2).

3. The pouring container (2) according to claim 1, wherein the side wall and/or the base comprises recesses.

4. A pouring container (2) for storing pourable foodstuffs, the pouring container comprising:
   a base (4);
   a side wall (6) connected to the base (4) and surrounding a storage chamber (18);
   a cuff (10) composed of an elastic material, the cuff (19) comprising a first end (12) connected to the side wall (6) and comprising a second end (14) comprising an upper opening (8);
   wherein a width of the cuff (10) decreases from the first end (12) to the second end (14) along a longitudinal axis (16) of the pouring container (2);
   wherein the cuff (10), due to an elasticity of the elastic material, is configured to be pushed into and pulled back out of the storage chamber (18) along the longitudinal axis (16) of the pouring container (2);
   a removable sealing element (20) configured to close the upper opening (8), wherein the removable sealing element (20) is shaped as a stopper configured to be inserted into the upper opening (8);
   wherein the removable sealing element (20) comprises a shank portion (32) having a shape and a size adapted to a shape and a size of the upper opening (8) such that a sealing abutment of a surface of the shank portion (32) against surfaces of the elastic material of the cuff (10) adjoining the upper opening (8) of the cuff (10) is established in a contact region of the shank portion when the stopper is inserted into the opening;
   wherein the shank portion (32) comprises an end facing the storage chamber (18) and the end comprises a thickened portion that is thicker than the contact region of the shank portion;
   wherein the removable sealing element (20) is configured to be connected pressure-tightly to the cuff (10) and the cuff (10) is connected pressure-tightly to the side wall (6).

5. The pouring container (2) according to claim 1, wherein the pouring container (2) is comprised at least partially from a transparent material and the cuff (10) is comprised of a nontransparent material.

6. The pouring container (2) according to claim 1, wherein the cuff (10) comprises a reinforcing element (24) arranged at the first cuff end or the second cuff end.

7. The pouring container (2) according to claim 1, wherein the cuff (10) comprises a reinforcing element (24) arranged at the first cuff end and the second cuff end.

8. The pouring container (2) according to claim 1, wherein the cuff (10) comprises a bending point (26) in at least one region, wherein the bending point is formed by a cuff portion of reduced material thickness.

* * * * *